United States Patent Office 3,453,117
Patented July 1, 1969

3,453,117
PROCESS FOR THE DETECTION OF CITRUS FRUIT INJURIES
Horton E. Swisher, Upland, Calif., assignor to Sunkist Growers, Inc., Los Angeles, Calif., a corporation of California
No Drawing. Filed Mar. 22, 1965, Ser. No. 441,848
Int. Cl. A23l *1/00*
U.S. Cl. 99—100                  10 Claims

ABSTRACT OF THE DISCLOSURE

Grading fruit by wetting the skins with a solution of ferric chloride to stain any injuries, separating the injured fruit and erasing the stains with a solution of phosphoric acid followed by a sodium carbonate wash, said ferric chloride solution being aqueous or acetone.

---

This invention relates to a method of quickly detecting injuries to citrus fruit occurring during or after harvesting.

The method may be employed in connection with experimental studies to determine the number and extent of fruit injuries resulting from certain harvesting and other operations used in picking and marketing citrus fruit.

The method may also be used in the commercial handling of citrus fruit to make better grading possible with respect to fruit injuries.

The method consists of chemically treating the fruit so that the injuries will develop a dark color ranging from grey to black and thus become clearly evident. The fruit may then be chemically treated, if desired, to remove the stain and return the fruit to its original appearance. If the method is used on fruit to be marketed it may be graded with respect to injuries after staining and before stain removal.

In harvesting and packing citrus fruits a certain percentage will be injured by rough handling and by the tools, equipment and machinery employed. Major injuries are readily detected but minor injuries, even with careful scrutiny, are often missed by the grader. As a rule minor injuries are not detrimental to the quality of the fruit directly but provide points or areas that are subject to inoculation by mold spores.

Certain of these molds will destroy the fruit if growth is established and others will, in addition, cause adjacent fruit to mold. Certain molds produce quantities of spores and mycelia which, during shipment, soil and adversely effect the outward appearance of sound fruit that may be in the same containers.

When injuries escape detection during fruit packing at the packing house, the subsequent losses incurred through spoilage can be substantial.

I have discovered that by treating fruit with solutions of ferric chloride, injuries will be rapidly stained to a dark color ranging from grey to black. This enables the grading inspectors to easily separate the sound fruit from that which has been injured. The injured fruit may be further graded with respect to the extent of injury. For example, the uninjured fruit could be marketed as No. 1 grade, fruit bearing minor injuries as No. 2 grade and the more heavily injured fruit used for the manufacture of various by-products. Since my novel procedure makes injuries very evident, automatic mechanical separation by means of electric eye scanning could be employed.

I have also discovered that the sensitivity of the method can be altered by the concentration of the ferric chloride solution used. Fruit to be shipped commercially may be treated with about a 1% aqueous ferric chloride solution which will stain approximately 50% of the injuries including all of the major ones. By using solutions up to about 10% aqueous ferric chloride, all injuries are stained. This level of sensitivity is probably too high to use on fruit to be shipped commercially but is very desirable for testing purposes. For example, if a new piece of fruit handling equipment is being designed the higher concentration would reveal any injuries imparted to the fruit in passing through the equipment.

EXAMPLE 1

Lots of sound oranges, lemons, grapefruit and tangerines were divided into four groups of four fruit each. Each group of four fruit (oranges, lemons, etc.) were treated to produce surface injuries in a manner calculated to simulate rough fruit handling as follows: A control (non-injured) group was included in each set.

(1) Skin punctured with needle
(2) Skin abraded with sandpaper
(3) Shallow surface cut with sharp knife
(4) Surface injured with stiff-bristled brush.

Following surface injury, each fruit was dipped for ½ minute in water solutions of ferric chloride ($FeCl_3 6H_2O$) of the strengths indicated. Results are given in the following table:

EFFECT OF DIPPING INJURED FRUIT IN FERRIC CHLORIDE SOLUTIONS

| Fruit | Injured or non-injured | Strength of ferric chloride dipping solution (percent) | Observed staining results on injured surface after treatment |
|---|---|---|---|
| Oranges | Injured | 0.25 | Grey to black. |
| Do | do | 0.50 | Black. |
| Do | do | 1.00 | Do. |
| Do | Non-injured | 1.00 | No staining. |
| Lemons | Injured | 0.25 | Grey. |
| Do | do | 0.50 | Grey to black. |
| Do | do | 1.00 | Black. |
| Do | Non-injured | 1.00 | No staining. |
| Grapefruit | Injured | 0.25 | Light grey. |
| Do | do | 0.50 | Grey. |
| Do | do | 1.00 | Black. |
| Do | Non-injured | 1.00 | No staining. |
| Tangerines | Injured | 0.25 | Black. |
| Do | do | 0.50 | Very black. |
| Do | do | 1.00 | Do. |
| Do | Non-injured | 1.00 | No staining. |

EXAMPLE 2

To erase the dark stain produced by ferric chloride treatment of the citrus fruits of Example 1, several chelating acids were used to chemically inactivate polyvalent metallic ions at concentrations of 1%. Sequestrene (EDTA) was also included after adjusting a 1% solution to pH 5.0 with hydrochloric acid. Sequestrene is the sodium salt of ethylenediaminetetraacetic acid. Following dipping of the stained fruit in these acid solutions for one minute, the fruits were finally dipped for another minute in a solution of 1½% soda ash, as is the usual commercial practice. The effect of these treatments on the stained injuries of the citrus fruits is recorded in the following table:

EFFECT OF SEVERAL TREATMENTS ON FERRIC CHLORIDE STAINED CITRUS FRUIT

| Nature of dip used | Concentration used in dipping solution, percent | Effect of acid treatment on stained fruit | Effect of soda ash treatment following acid dip |
|---|---|---|---|
| EDTA | 2 | Partially removes stain. | Stain reappears. |
| Fumaric | 1 | do | Do. |
| Acetic | 1 | do | Do. |
| Tartaric | 1 | Completely removes stain. | Stain partially reappears. |
| Gluconic | 1 | do | Do. |
| Citric | 1 | do | Do. |
| Phosphoric | 1 | do | Stain does not reappear. |

In order to rapidly remove or erase the stain from fruit to be subjected to an alkaline wash I treat the fruit with a dilute solution of phosphoric acid. Such a phosphoric acid solution according to my invention should contain from about ¼% to about 2% phosphoric acid as exemplified by the 1% indicated above. Gluconic or citric acid would be suitable if the usual alkaline wash is omitted. Since these chemicals are non-toxic, residual amounts remaining on the fruit present no problem. Fruit selected for making products can be diverted to this use without removing the stain since the small amount of iron residue will be of no consequence. The speed of color development and intensity was greatest in tangerines and least in grapefruit. Green and silvered lemons did not develop as much color as ripe lemons. According to my observations the order of effectiveness as judged by the intensity of the stain would be as follows: Tangerines, oranges, lemons, grapefruit.

I have discovered that a 1% solution of ferric chloride in water will rapidly develop color at the points of injury. Solutions containing ½% and ¼% ferric chloride also work well but a longer time is required to develop a color intensity that approaches that of the 1% solution. The solution may be used at any temperature that would not be injurious to the fruit. As a practical matter temperatures in the range from about 35° to 90° F. usually would be employed. The following tests were conducted giving the results indicated:

EXAMPLE 3

As a practical test of the method, oranges that had been subjected to rough handling were used in this experiment. Oranges coming from a citrus packing house were taken at random from the belt as they were being unloaded at the by-products plant. Each of the 23 oranges selected were examined carefully for observable skin injuries that occurred in the packing house operation or subsequently in transit. After recording the injuries detectable to the eye, the oranges were dipped for ½ minute in 1% ferric chloride solution and again observed for injuries as indicated by staining. A comparison of these two results is given below:

FERRIC CHLORIDE AS MEANS OF IMPROVING DETECTION OF FRUIT INJURY

| Fruit | No. of injuries detectable before dipping | No. of injuries detectable after dipping | No. of additional injuries detected by ferric chloride dip |
|---|---|---|---|
| 1 | 2 | 5 | 3 |
| 2 | 3 | 4 | 1 |
| 3 | 4 | 8 | 4 |
| 4 | 7 | 9 | 2 |
| 5 | 5 | 6 | 1 |
| 6 | 4 | 10 | 6 |
| 7 | 3 | 6 | 3 |
| 8 | 2 | 5 | 3 |
| 9 | 3 | 7 | 4 |
| 10 | 5 | 9 | 4 |
| 11 | 2 | 4 | 2 |
| 12 | 2 | 7 | 5 |
| 13 | 5 | 12 | 7 |
| 14 | 4 | 9 | 5 |
| 15 | 2 | 9 | 7 |
| 16 | 5 | 7 | 2 |
| 17 | 6 | 11 | 5 |
| 18 | 3 | 10 | 7 |
| 19 | 2 | 6 | 4 |
| 20 | 3 | 12 | 9 |
| 21 | 4 | 7 | 3 |
| 22 | 2 | 4 | 2 |
| 23 | 1 | 4 | 3 |

From the table above it can be seen that many fruit injuries would have escaped detection by simple visual examination. As many as nine additional fruit injuries were discovered on fruit No. 20 through the use of the method described.

I have also discovered ways to make my process more sensitive especially at the lower concentrations of ferric chloride. These involve either treating the fruit under vacuum or adding a suitable detergent or wetting agent to the solution or using both of these methods as indicated in the following example.

EXAMPLE 4

A batch of 12 early season navel oranges that had been stored about 3 weeks was selected and subjected to needle-point injury before dipping in 1% ferric chloride solution. Each orange was given 50 minute surface punctures to a depth of 1 mm. by using a fine-pointed steel needle backed with a cork to limit depth of penetration. To identify location, each puncture point was circled using an ink pencil. In addition to dipping each orange for 1½ minutes in 1% ferric chloride solution, other variables included use of a suitable detergent such as a mixture of ionic and anionic surfactants (Process Chemical Co., 7–7697–17) at a 0.3% level and treatment under 27″ vacuum to improve penetration. By visual observation, the stained injuries (3 fruits per treatment) in each fruit were counted. Results are given in the following table:

EFFECT OF VACUUM TREATMENT AND DETERGENT ON FERRIC CHLORIDE STAINING OF INJURED ORANGES

| Treatment 1½ minutes dip as follows | Total number of injuries per fruit (average) | | | |
|---|---|---|---|---|
| | Definite staining | Questionable staining | No apparent staining | Total injuries |
| (A) Ferric chloride solution | 26 | 20 | 4 | 50 |
| (B) Ferric chloride solution plus vacuum treatment | 36 | 11 | 3 | 50 |
| (C) Ferric chloride and detergent solution | 31 | 16 | 3 | 50 |
| (D) Ferric chloride and detergent plus vacuum treatment | 37 | 11 | 2 | 5 |

Although only 26 minute needle-point injuries (1 mm. deep) out of a total of 50 inflicted were definitely visible when the injured fruit was dipped in a 1% aqueous ferric chloride solution, I have discovered that at higher ferric chloride concentrations, approaching 10%, all injuries were definitely identifiable. High ferric chloride concentrations are, however, injurious to the skin of the fruit.

When acetone is used as the solvent for ferric chloride rather than water, the stain penetrates more deeply and is more pronounced but skin injury results.

Probably my most pertinent discovery relates to the use of dual solutions for detecting the very minor or superficial wounds on the surface of citrus fruits.

If a citrus fruit is dipped in a solution of ferric chloride in the approximately range of 1 to 5% followed by dipping in a solution of tannic acid in the range of 1 to 5%, injuries are detectable by an almost instantaneous development of a deep blue-black color. Gallic acid may be used in place of tannic acid but the latter is preferred. The order of dipping can be in either direction with equal intensity of color development. In order to prevent diluting one solution with the other a water rinse between dips is desirable.

Such needle-point injuries (1 mm.) as are described above that are not visually detectable, are almost immediately obvious by this procedure. Also sand paper abrasion and heavy brush marks are detectable.

EXAMPLE 5

As an example of the improved ability to detect superficial injury using dual solutions of 2% concentration, several oranges from the belt of a by-products plant that had been handled roughly in the interval between picking and arrival at the processing plant were tested as follows:

COMPARISON OF METHODS FOR FRUIT INJURY DETECTION

| Oranges treated | Number of injuries readily detectable | |
|---|---|---|
| | Fruit dipped in ferric chloride solution only | Fruit dipped in both ferric chloride and tannic acid solutions |
| 1 | 20 | (¹) |
| 2 | 13 | (¹) |
| 3 | 56 | 70 |

¹ Too many to accurately count.

It will be seen from the foregoing disclosure that my process may be used in various ways to provide whatever degree of sensitivity is desired. The injuries will be revealed essentially in the order of their magnitude as the more sensitive procedures of my method are employed. The less sensitive procedures would normally be used for fruit to be shipped commercially and the more sensitive procedures in the field or laboratory for determining the locus and extent of injury imparted in the harvesting and handling of citrus fruits.

I claim:

1. A method of staining citrus fruit injuries which comprises wetting the surface of the fruit with an acetone solution containing between about ¼% and about 10% ferric chloride.

2. A method of grading citrus fruits comprising wetting the skins of the citrus fruit with a ferric chloride solution containing between about ¼% and about 10% of ferric chloride to stain any injuries on the skins, separating the fruit on the basis of the injuries revealed, and erasing the stains by wetting the fruit with a solution containing at least ¼% by weight of phosphoric acid.

3. A method as claimed in claim 2 in which the ferric chloride solution contains about 1% ferric chloride and the phosphoric acid solution contains from about ¼ to 2% phosphoric acid.

4. The method recited in claim 2 in which the ferric chloride solution contains about 1% ferric chloride and the phosphoric acid solution contains about 1% phosphoric acid.

5. A method as in claim 2 wherein the phosphoric acid solution contains between about ¼% and 2% phosphoric acid.

6. A method as in claim 2 wherein the phosphoric acid solution contains about 1% phosphoric acid.

7. A method as in claim 2 wherein the phosphoric acid wetting is followed by a sodium carbonate wash having in the order of about 1½% sodium carbonate.

8. A method of grading citrus fruits comprising wetting the skins of the citrus fruit with a ferric chloride solution containing between about ¼% and about 10% ferric chloride to stain any injuries of the skins, separating the fruit on the basis of the injuries revealed, and erasing the stains by wetting the fruit with a solution selected from the class consisting of phosphoric acid, citric acid, tartaric acid and gluconic acid, containing a minor proportion of the acid, and then washing the fruit with a minor proportion of sodium carbonate to remove residual acid and prevent stains from reappearing.

9. A method as in claim 8 wherein the acid is phosphoric acid and the sodium carbonate wash contains in the order of about 1½% sodium carbonate.

10. A method of staining citrus fruit injuries which comprises wetting the surface of the fruit sequentially with a ferric chloride solution containing between about 1% and about 5% of ferric chloride and with a gallic acid solution containing between about 1% and about 5% of gallic acid.

References Cited

UNITED STATES PATENTS

| | | | |
|---|---|---|---|
| 1,813,357 | 7/1931 | O'Neill et al. | 99—103 |
| 1,813,358 | 7/1931 | O'Neill et al. | 99—103 |
| 1,890,475 | 12/1932 | Todd | 99—102 |
| 2,212,432 | 8/1940 | Brandt | 99—103 |
| 2,233,447 | 3/1941 | Dolman | 99—103 |

FOREIGN PATENTS

| | | |
|---|---|---|
| 603,294 | 6/1946 | Great Britain. |

OTHER REFERENCES

Hackh's Chemical Dictionary, 2nd ed., Blakiston's Son & Co. Inc., Philadelphia, 1937, p. 406.

RAYMOND N. JONES, *Primary Examiner.*

J. M. HUNTER, *Assistant Examiner.*

U.S. Cl. X.R.

99—103

PO-1050
(5/69)

UNITED STATES PATENT OFFICE
CERTIFICATE OF CORRECTION

Patent No. 3,453,117  Dated  July 1, 1969

Inventor(s) Horton E. Swisher

It is certified that error appears in the above-identified patent and that said Letters Patent are hereby corrected as shown below:

Column 4, line 30, the numeral "5" in the last column should read --50--; line 45, "approximately" should read --approximate--.

SIGNED AND
SEALED
OCT 21 1969

(SEAL)
Attest:

Edward M. Fletcher, Jr.
Attesting Officer

WILLIAM E. SCHUYLER, JR.
Commissioner of Patents